United States Patent [19]

Limiroli

[11] Patent Number: 4,896,698
[45] Date of Patent: Jan. 30, 1990

[54] PRESSURE ADJUSTING DEVICE FOR CONTROLLING LIQUID GAS FLOW RATE

[76] Inventor: Mario Limiroli, Via Medici del Vascello, 26, 20138 Milano, Italy

[21] Appl. No.: 190,507

[22] Filed: May 5, 1988

[30] Foreign Application Priority Data

Mar. 22, 1988 [IT] Italy .................................. 19890 A/88

[51] Int. Cl.⁴ ............................................. F16L 37/28
[52] U.S. Cl. ..................... 137/614; 137/458; 137/637.05; 251/149.9
[58] Field of Search .............. 137/614.06, 458, 637.05, 137/614; 251/149.9

[56] References Cited

U.S. PATENT DOCUMENTS

| | | | |
|---|---|---|---|
| 3,143,143 | 8/1964 | Taylor et al. | 137/458 |
| 4,359,066 | 11/1982 | Hunt | 137/614.06 |
| 4,503,883 | 3/1985 | Meacham, Jr. | 137/458 |
| 4,550,746 | 11/1985 | Honsen et al. | 137/458 |

FOREIGN PATENT DOCUMENTS

| | | | |
|---|---|---|---|
| 633324 | 12/1961 | Canada | 137/458 |
| 2027852 | 2/1980 | United Kingdom | 251/149.9 |

*Primary Examiner*—A. Michael Chambers
*Attorney, Agent, or Firm*—Bucknam and Archer

[57] ABSTRACT

The device comprises a body consisting of a top half shell and a bottom half shell, coupled to one another through the interposition of a resilient membrane which defines a pressure control chamber and a pressure reducing and metering chamber, communicating with a delivery gas outlet, the bottom half shell defining a coupling end piece with the valve of the gas pressure vessel, and a quick coupling being moreover provided, operating between the end piece and the valve, which quick coupling is adapted to operatively engage with the operating handle of a gas control valve of the adjusting device for preventing the adjusting device from improperly engaging with or disengaging from the gas pressure vessel as the gas control valve means is in its open position.

3 Claims, 2 Drawing Sheets

PRESSURE ADJUSTING DEVICE FOR CONTROLLING LIQUID GAS FLOW RATE

BACKGROUND OF THE INVENTION

The present invention relates to an improved pressure adjusting device for controlling the flow rate of liquid gases.

As is known, on liquid petroleum gas pressure vessels or bottles there are usually mounted pressure adjusting devices applied to control or adjust the pressure of the gas outflow.

Conventional gas flow rate adjusting devices comprise a resilient membrane which divides the inside of the pressure adjusting device into a pressure reducing and delivery chamber and a control chamber, which communicates with the atmosphere pressure and therein there are housed resilient means.

Depending on the outlet gas flow rate, said resiliennt membrane is deformed in both directions so as to adjust the gas outflow.

The presently known pressure adjusting devices, however, are affected by the drawback that the gas outlfow can be hardly shut off in the case of a leak caused, for example, by a breakage of the resilient membrane or outer gas delivery hose, or of a leak through the pressure adjusting device or in the gas supplying system downstream of said pressure adjusting device.

Another drawback of known gas pressure adjusting devices is that they may be erroneously coupled to the gas bottles by the user, with consequent gas leaks.

SUMMARY OF THE INVENTION

Accordingly, the main object of the present invention is to overcome the above mentioned drawbacks, by providing an improved pressure adjusting device which can be properly coupled to the gas bottle, exclusively as the gas flow shut off means of said bottle are safely closed.

Another object of the present invention is to provide such a pressure adjusting device which is adapated to accurately control the gas flow rate, while automatically shutting off the gas flow in a case of an excessive flow rate.

Another object of the present invention is to provide a pressure adjusting device adapted to automatically shut off the gas flow as gas leaks occur through the pressure adjusting device or in the downstream gas system.

Still another object of the present invention is to provide a pressure adjusting device which is very reliable and safe in operation.

Still another object of the present invention is to provide a pressure adjusting device which can be easily constructed starting from easily available materials and components and which, moreover, is very competitive from a mere economic standpoint.

According to one aspect of the present invention, the above mentioned objects, as well as yet other objects, which will become more apparent hereinafter, are achieved by an improved pressure adjusting device for controlling the flow rate of liquid gases, comprising a body consisting of a bottom half shell and a top half shell, which are coupled to one another through the interposition of a resilient membrane, said resilient membrane defining a control chamber and a pressure reducing and delivery chamber, communicating with a delivery mouth or outlet, said bottom half shell defining with the valve of the pressure vessel a coupling end piece, characterized in that said pressure adjusting device further comprises quick coupling means operating between said coupling end piece and valve, adapted to operatively engage with the handle for operating the valve means of the pressure adjusting device so as to prevent said pressure adjusting device from improperly engaging with and/or disengaging from said pressure vessel as said valve means are in their open position.

The automatic shut off. of the gas flow being performed by means of a suitable lever arranged in the gas delivery chamber and adapted to lock at a closing position a gas flow adjusting piston member.

BRIEF DESCRIPTION OF THE DRAWINGS

Further characteristics and advantages of the present invention will become more apparent hereinafter from the following detailed description of a preferred, though not exclusive, embodiment of a pressure adjusting device according to the invention, which is illustrated, by way of an indicative but not limitative example, in the figures of the accompanying drawings in which.

DESCRIPTION OF THE PREFERRED EMBODIMENT

Figure 1:
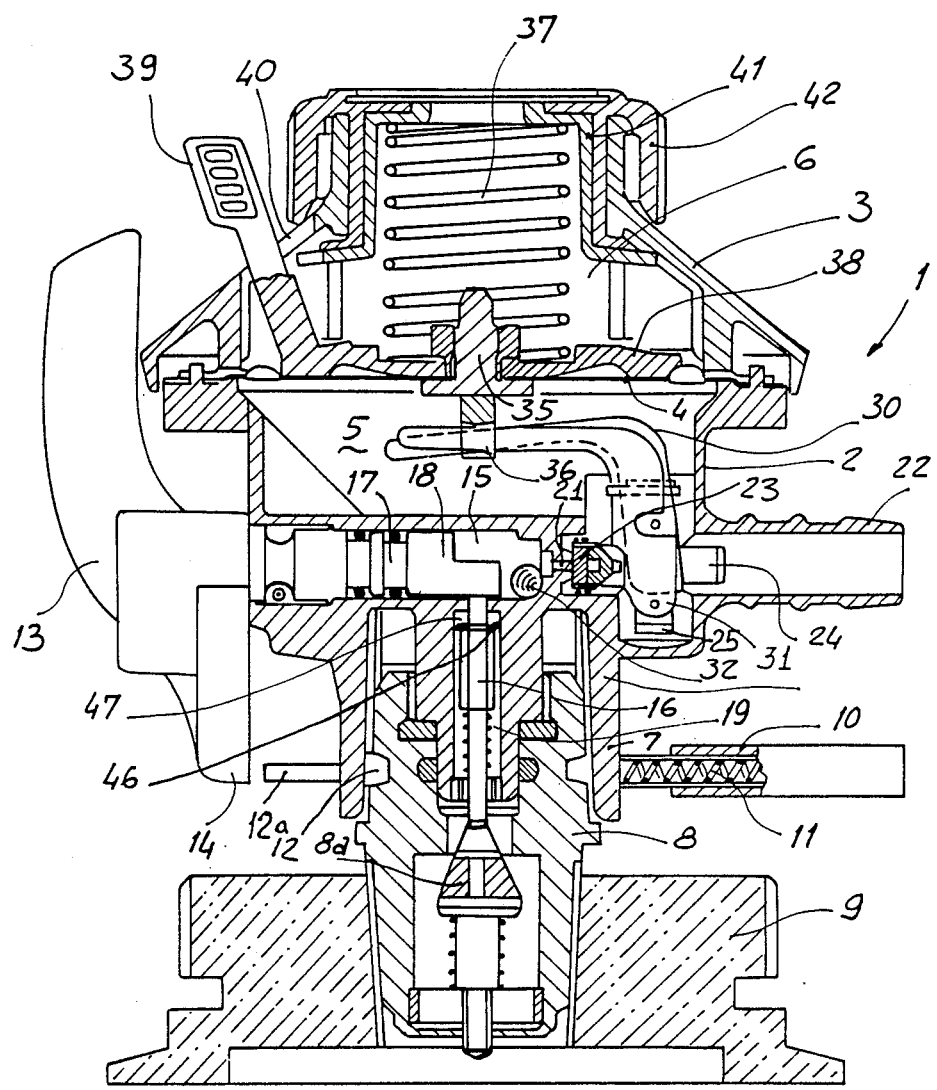
FIG. 1 is a cross-sectional view illustrating the pressure adjusting device according to the invention, the valve means being shown in their open condition.

With reference to the figures of the accompanying drawings, the improved pressure adjusting device for controlling the flow rate of liquid gas according to the present invention, comprises a body, indicated overally at the reference number 1, which substantially consists of a bottom half shell 2 thereto there is coupled a top half shell 3, with the interposition of a resilient membrane 4; this membrane 4 defines a gas delivery chamber 5 at the bottom half shell 2, and a gas control chamber 6 communicating with the atmosphere and formed inside said top half shell 3.

At the lower portion of the bottom half shell 2 there is defined a cylindrical end piece 7 which can be coupled to the valve 8, which valve is usually provided on a pressure vessel or bottle, indicated overally at 9 and holding the liquid gas.

A main feature of the present invention is that between the end piece 7 and valve 8, in the inside of which there is provided a gate member 8a, there are provided quick-coupling means consisting of a slider 10, counterbiassed by a spring 11, which transversely extends of the axis of the valve 8 and engages in a groove 12 formed on the valve.

The slider 10 is provided with variable size holes on the fork member 10a, and a spring 11 is provided for holding said slider 10 engaged in the groove 12. As it should be apparent, by pressing on said slider 10 against the force of said spring 11, a greater diameter hole or opening will be brought at said groove so as to afford disengaging.

In order to prevent the pressure adjusting device from being improperly coupled, or engaged with/disengaged from the pressure vessel or bottle 9 as the valve means of the pressure adjusting device are in their open condition, the knob 13 for driving said valve means is provided with a lug 14.

As shown in FIG. 1, this lug, in an opening condition, will be arranged on the path of the slider 10 so as to prevent this slider from sliding; in this way the pressure adjusting device can not be coupled to or detached from the gas holding pressure vessel or bottle.

Figure 2:
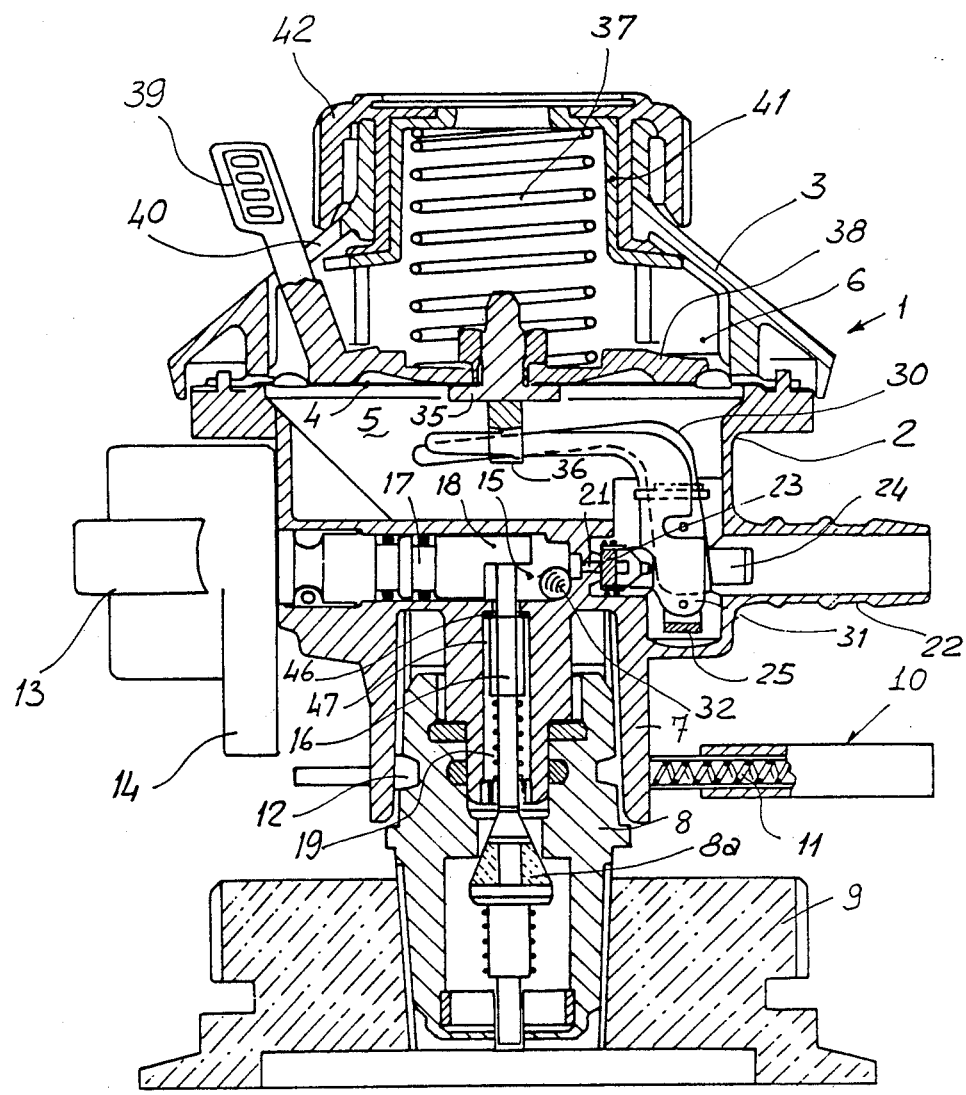
FIG. 2 illustrates the pressure adjusting device of FIG. 1 with the valve means shown in their closed condition.

With the knob 13 in its closing condition, as schematically shown in FIG. 2, the slider will be able of freely sliding and, accordingly, the pressure adjusting device cann be removed.

In this connection, it should be apparent that, in a case of a not perfect coupling, the knob 13 can not be rotated from the closing position to the opening position, since, during such an operation, the lug 14 will abut against the slider 10 which has not yet reached its proper engaging position.

Inside the bottom half shell 2 there is formed a gas inlet chamber 15 thereinto liquid gas is supplied in a filtered condition by passing through the gap existing between the sliding hole and the stem or shaft 16 axially arranged inside the end coupling piece 7.

In said chamber 15 there is arranged a driving cam member 17 which is coupled to the knob 13 and is provided with a cam surface 18.

This cam surface 18 cooperates with the top end of said stem 16 in order to cause said stem to be displaced against resilient biassing members 19 acting on said stem 16 which projects at the bottom so as to engage with the gate member 8a.

At the output of the chamber 15 there is provided a nozzle 21, which communicates with the outlet 22 of the gas delivery chamber and is controlled by a sealing gasket 23 supported by a small axially sliding piston 24 which is able of axially sliding with respect to the outlet 22.

The piston 24 is slidingly supported by a support 25, which is housed in an extension of the gas delivery chamber 15.

On said piston 24 two levers 30 and 31 operate, which levers are articulated to the support 25 at symmetrical positions with respect to said piston and are respectively provided for adjusting and controlling the gas excess flow.

More specifically, said levers 30 and 31 are coupled to the middle portion of the membrane 4, by means of a bracket 35 to the lower portion of which there is coupled the pin member 36 supporting the respective legs or arms of the levers.

As is shown, the bracket 35 bears, at its opposite end, on the middle portion of the membrane 4 so as to form therewith a single body which is pressed by an adjusting spring 37 operating on a plate member 38 provided with a vertically extending arm, indicated at 39.

This vertical arm projects through the window 40 which is defined through the top half shell 3.

The lever 30 is provided for slidingly driving the piston 24 depending on the raising of the membrane 4, so as to adjust or control the gas flow coming from the pressure vessel.

The second lever 31, in turn, operates in the reverse way by driving the piston as the membrane is arranged in its lowered position, for example because of a gas take up greater than the rated flow rate of the pressure adjusting device, such as in the case of a breakage or disengaging of the gas supply hose, or of the membrane, during the liquid gas supplying period, or in the case of small gas leaks.

As is shown, in the cavity defined by the chamber 15 there is housed a small ball 32 which, as the gas flow rate is greater than the rated flow rate of the pressure adjusting device, will be entrained by the gas flow against the nozzle 21, so as to generate a greater flow loss and cause the membrane to be depressed and operate the second lever 31 so as to shut off the gas delivery by means of the piston 24.

As shown an axially movable slider member 41 abuts on the adjusting spring 37 which slider member is adapted to upwardly and downwardly move, without rotating, under the control of a rotating handwheel 42 screw engaged therewith.

More specifically the top end of stroke position of said slider 41 will set the minimum desired output gas pressure, the maximum gas pressure being controlled by the bottom end of stroke position of said slider as said handwheel is idly rotated.

In this connection it should be pointed out that the device according to the invention will be always held in a safe condition, and it can be reset to a proper operation condition by simply manually operating the vertically extending arm 39.

In fact, as said vertical arm 39 is operated, the plate member 38 will be raised so as to disengage the membrane 4 from the pressure of the spring 37, thereby raising the lever 31 and opening the nozzle 21 to allow for the liquid gas to normally flow.

The manual operation for opening and closing the pressure adjusting device, and hence the gas supply, is performed by rotating the knob or handle 13, which is rigid with the eccentric shaft 17 driving said stem 16 thereon there is rigidly mounted an O-ring sealing gasket 46, which, as it is vertically displaced will open and shut off the gas passage port from the chamber 47 to the chamber 15.

From the above disclosure it should be apparent that the invention fully achieves the intended objects.

In particular the fact should be pointed out that the pressure adjusting device according to the invention can not be engaged to or disengaged from the pressure vessel as the valve means are in their open position, and moreover the gas supplying operation can not be started unless the device has been properly engaged.

Moreover this device has a very safe operation, since the levers 30 and 31 will operate automatically for controlling the outflow of the gas or shut off it, in a case of any malfunctions.

The invention as disclosed is susceptible to many modifications and variations all of which will come within the spirit and scope of the appended claims.

I claim:

1. A pressure adjusting-coupling device for controlling the flow rate of liquid gases, comprising a body consisting of a bottom half shell and a top half shell, coupled to one another through a resilient membrane, said resilient membrane defining with said top half shell and bottom half shell respectively a gas control chamber and a gas pressure reducing and delivery chamber, communicating with a gas delivery outlet, said bottom half shell defining with a gas control valve of a gas holding pressure vessel a coupling end piece, quick coupling means being moreover provided operating between said coupling end piece and said gas control valve, operatively engaging with a handle for operating valve means of the pressure adjusting device so as to prevent said pressure adjusting device from improperly engaging with and/or disengaging from said pressure vessel as said valve means are in their open position, said quick coupling means consisting of a resilient biassed slide member movable transversely of said coupling end piece, said slide member being provided with openings having edges removably engaging in an annular groove formed on said coupling end piece, one end of said slide member abutting against a lug of said operating handle with said operating handle in its open position, wherein said pressure adjusting-coupling device further comprises, in said delivery chamber, a first and a second lever pivoted to a support member for guiding a piston member controlling a gas delivery nozzle, said levers including each a long arm engaging with a bracket rigid with a middle portion of said resilient membrane and a plate provided with a side driving arm projecting from said chamber, said first and second levers, as they are operated, causing said piston member to slide in opposite directions with respect to said resilient membrane.

2. A device according to claim 1 comprising an adjusting spring acting on a middle portion of said plate, said adjusting spring being calibrated by a slider able of axially sliding so as to engage with a handwheel rotatably supported by said top half shell, a top limit switch being provided for setting a minimum output pressure of said gas and a bottom limit switch being provided for setting a maximum output pressure of said gas.

3. A pressure adjusting device according to claim 1, wherein one of said levers is adapted to operate as a gas flow rate adjusting member, by driving said piston as said resilient membrane is raised, the other of said levers being adapated to operated as a member for adjusting an excess of flow of said gas by driving said piston as said resilient membrane is lowered, said support member of said levers operating as a guide member for said piston.

* * * * *